United States Patent Office 3,255,975
Patented June 14, 1966

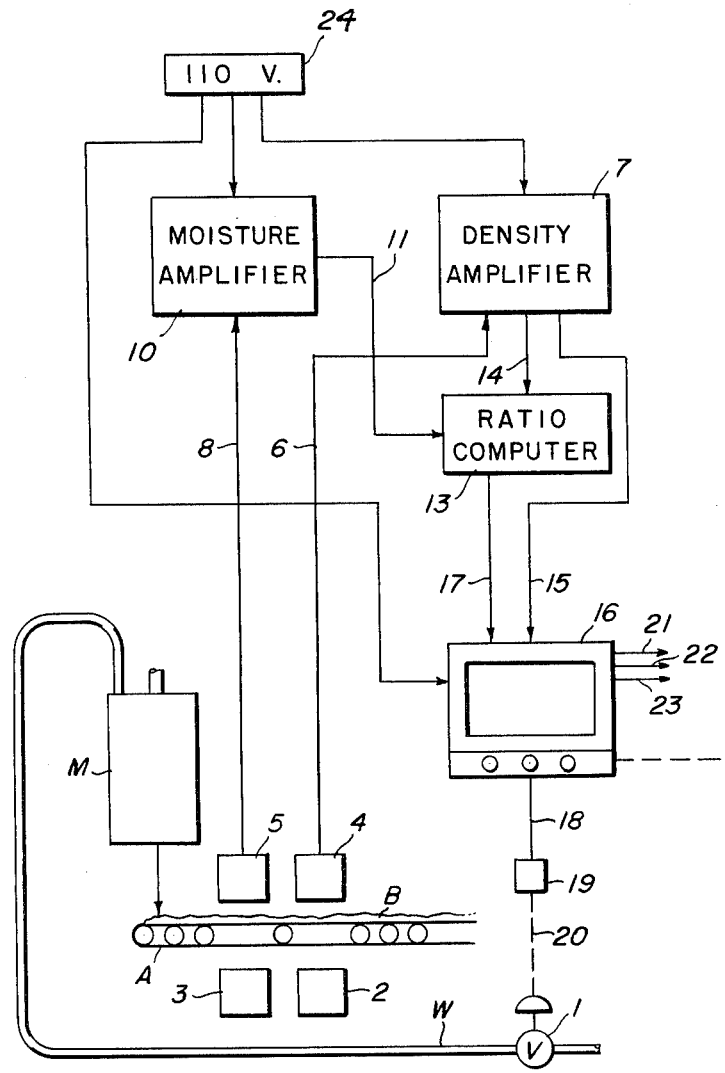

3,255,975
MOISTURE CONTENT CONTROL APPARATUS FOR CONTINUOUSLY PRODUCED MATERIAL
Leonard E. Malin, Dolton, Ill., and Kelly J. Scuderi, Crown Point, Ind., assignors to The Youngstown Sheet and Tube Company, Youngstown, Ohio, a corporation of Ohio
Filed Apr. 24, 1963, Ser. No. 275,327
2 Claims. (Cl. 241—34)

This invention relates to control of the moisture content in comminuted material continuously produced in a mixing mechanism and carried therefrom by a conveyor or the like and is especially directed to apparatus suitable for controlling a valve interposed in a water supply line to adjust the amount of water delivered to the mechanism, such as a plug mill, in relation to the delivery thereto of relatively dry comminuted material to thereby maintain in the material discharged to the conveyor a substantially constant moisture content.

With particular reference to its adaptability for use in controlling the moisture content of material to be sintered for use in steel mill operations it will be apparent as the following description proceeds that the specific chemical composition of the comminuted material is of little if any significance since our apparatus comprises an instrument responsive to changes in the number of hydrogen atoms per unit volume as an index of the amount of moisture present.

It is therefore a principal object of the invention to provide apparatus responsive to changes in the moisture content of a material moving in a substantially continuous stream on a conveyor or the like to control the admission of water to the unit by which the material is being produced from ingredients supplied to it by other means.

A further object is the provision of a system of controlling the moisture content of a progressively generated material which comprises apparatus operative to compose a signal predictated on the density and moisture content of the material, apparatus operative to compose a standard signal predicated on theoretical density and desired moisture content of a generally comparable material, means operative to compare said signals with each other and create a signal predicated on the difference if any between them, and means for utilizing said last mentioned signal to regulate the admission of water to the material while in process of generation.

A still further object is the provision of a system for maintaining the moisture content of a progressively generated material in substantially constant relation to a standard equivalent to the density and moisture content of an hypothetical comparable material, which said system comprises apparatus for continually moving the first mentioned material from its point of generation, apparatus operative to determine the density and other apparatus to determine the moisture content of that material as it passes said apparatus and to combine said determinations into a signal, other apparatus operative to provide a standard signal predicated on an assumed density and moisture content of an hypothetical generally comparable material, apparatus operative to determine the difference, if any, between said first mentioned and standard signals and to produce a signal in correspondence to said difference and apparatus operable by said produced signal adapted to regulate in accordance therewith the admission of water to the point of generation of the material.

Other objects, purposes and advantages of the invention will hereinafter more fully appear or will be understood from the following description of a preferred embodiment of the apparatus contemplated thereby having reference to the accompanying schematic drawing, the single figure of which represents the relation between the several components of the apparatus in the sense of their interconnection through electronic and/or impulse conductors rather than their relative physical positioning.

It is of course generally known that where a material is exposed to a source of gamma rays some of the rays are absorbed, some reflected and some transmitted by the material and that the percent transmitted is an inverse function of the density of the material, i.e., the denser the material the fewer the rays transmitted by it, all other factors being equal; moreover, that the reflection of neutrons from such material can be measured to provide a signal which is directly proportional to volumetric moisture percentage therein, particularly when most of the hydrogen atoms contributing to its composition are those present in the water it contains, since hydrogen is the most efficient of the common elements known to have the capacity for modifying neutrons and reducing their energy.

Apparatus embodying the invention accordingly operates to provide signals reflecting the density and moisture content of the material being examined, and includes a component which combines these signals into one and compares it to a standard signal identical with that produced when the density and moisture content are at desired values and on the basis of such comparison if the occasion warrants produces another signal which when transmitted to another suitable instrument brings about an adjustment of the control of the water supply to the unit producing the material to thereby restore the moisture content in the product of the latter to said desired value.

More particularly the invention may appropriately be utilized among its other possible industrial applications for controlling the water supply to a mixing device such as a pug mill operating to mix together the ingredients of a sinter mix to be fed to sintering apparatus in the steel industry.

In the production of such sinter mix relatively finely comminuted solids, such as ore fines, ground limestone, coke breeze and the like, which may contain varying low amounts of moisture, are agglomerated during introduction of a small amount of water to produce a relatively cohesive mixture suitable for charging into a sintering machine, and it has been the practice for an operator to make a physical examination of the raw product or of the completely processed product of the sintering machine and manually to make such adjustments of the water supply control valve as he deems appropriate. Apart from the fact that this procedure is dependent on human skill and judgment, which may vary among different operatives, there is necessarily an appreciable time lag between the occurrence of an incident the happening of which results in too much or too little water being supplied and the making of the adjustment necessary to counteract it whereby a large quantity of unsuitable or undesirably non-standard material may be produced during that period.

In accordance with the invention, however, once a desired standard for moisture contact in the product of the mixer unit has been determined and appropriate adjustments corresponding thereto made on a recording instrument included in the apparatus the latter operates continuously and automatically thereafter to maintain the moisture content of the product within accepted tolerances at or closely adjacent said desired standard value.

Hence as we have indicated in the drawing our apparatus is conveniently associated with a conveyor A continuously carrying a substantially uniform volumne per unit length of the product of a mixing unit such as a pug mill M into which a water supply conduit W controlled by a pneumatically actuated diaphragm valve 1 discharges. Adjacent conveyor A is a gamma ray generating unit 2 appropriately positioned to emit gamma rays for impingement against the burden B on conveyor A and a neutron source 3 by which burden B is bombarded with high energy neutrons. Disposed to detect respectively the percent of gamma rays in the original emission and the proportion of low energy neutrons transmitted or reflected by the conveyor burden are detector heads 4, 5 respectively sensitive to gamma rays transmitted through the burden in response to the gamma ray bombardment and to low energy or hydrogen modified neutrons. Detector head 4 is connected by a conductor 6 to a density amplifier 7 which in response to signals received therethrough from head 4 generates signals pedicated on the density of the conveyor burden. Detector head 5 on the other hand is connected by conductor 8 to a moisture amplifier 10 and directs thereto signals predicated on the moisture content per unit volume of the conveyor burden; then these signals after amplification are directed from the unit 10 through a conductor 11 to a ratio computer 13 which through conductor 14 also receives from density amplifier unit 7 signals produced by the latter reflecting the density of the conveyor burden. The ratio computer 13 correlates these moisture- and density-related signals and in terms of ratio or a percentage of the whole generates a signal appropriate for comparison with a "desired value" or standard moisture per unit weight signal manually preset and transmitted through conductor 15 to recorder 16 which in accordance with the above described procedure has been adjusted to compare this standard signal with the signal from the ratio computer received through conductor 17 in such manner as to deliver through a conductor 18 a signal appropriate for actuating an electro-pneumatic transducer 19 when the difference between these two signals indicates need for an adjustment in the water supply. The transducer thereupon through an air impulse conductor 20 effects adjustments in diaphragm valve 1 controlling the water supply and hence the amount of water being introduced to mill M in accordance with the requirements of the feed, the several instruments respectively receiving required energizing current from a conventional power source 24.

It will be understood that many of the instrumentalities to which reference has been made require for best results auxiliary elements of various types but as these are well known in the art it is believed unnecessary to described or illustrate them in further detail, especially as the principal units herein mentioned are available with such auxiliary elments operative associated with them, while references herein made to conductors are to be construed to include pairs of conductors, particularly where electrical circuits are concerned. Thus, for example the, Qualicon Model 507 Bulk Moisture Gage manufactured by Nuclear-Chicago Corporation, Des Plaines, Illinois, as offered on the market includes radiation source 2, detector heads 4, 5, amplifiers 7, 10 and ratio computer 13 together with the essential components of each of these units and the several conductors through which they are interconnected and/or connected with other instrumentalities, while Catalog No. 60302–E5 Special Model "S" Speedomax "G" Recorder Controller Serial Number 62–22224–1–1, manufactured by Leeds & Northrup, Philadelphia 44, Pennsylvania, includes recorder 16 and electro-magnetic transducer 19, their essential component and corresponding connecting conductors, air conduits and the like.

The latter instrument also normally includes in a recording section conventional instruments (not shown) connected thereto by conductors 21, 22, 23 whereby records of the density and moisture in the feed and total moisture therein can be made in a form capable of preservation for future reference but the specific nature and functions of these latter auxiliary instruments constitute no part of the invention and their utilization is but a matter of choice.

Moreover, while we have herein referred to and prefer to employ certain instruments known in the art and readily available by trade designations as herein noted, we do not desire or intend thereby to limit or confine our invention in any way nor to restrict its employment to the art in which we have thus far deemed it primarily useful; in consequence it will be understood the specific details of construction of the several instrumentalities we employ constitute no part of the invention and that instrumentalities other than those to which we have referred may be substituted for the latter provided they are capable respectively of performing the same or equivalent functions and other changes and modifications in the apparatus we have diagrammatically illustrated and herein described as well as modifications in the procedures we prefer will readily occur to those skilled in the art and may be utilized as desired without departing from the spirit and scope of the invention as defined in the appended claims.

Having thus described our invention we claim and desire to protect by Letters Patent of the United States:

1. Apparatus for controlling the moisture content per unit weight of a continuously generated progressively moving bulk product comprising
    (a) means for comminuting the product,
    (b) mean for progressively moving the product from said comminuting means,
    (c) means for supplying water to said comminuting means,
    (d) means disposed adjacent said product-moving means for generating a signal related to the moisture content per unit volume of said comminuted product,
    (e) means disposed adjacent said product moving means for generating a signal related to the density of said comminuted product,
    (f) means for correlating said signals operative to produce a signal related to moisture content per unit weight of said product,
    (g) means responsive to said last mentioned signal for detecting a difference between said signal and a predetermined signal to produce a signal related to said difference, and
    (h) means responsive to said difference-related signal to modify the operation of said water supply means in correspondence to said difference.

2. In combination with conveying means for transporting a substantially continuous feed material consisting of moisture-containing agglomerated particles, means for modifying the moisture content of said material, radiation sources disposed adjacent said conveyor respectively adapted to direct particle emissions and high energy neutrons toward the conveyor for impingement against the material thereon, detecting means disposed in the path of particles transmitted by said material in response to said particle emission and adapted to produce a signal related to the numerical proportion of said transmitted particles with respect to the total quantity of particle emission, other detecting means disposed in the path of modified neutrons emitted from the material on the conveyor and adapted to produce a signal related to the energy of said emitted neutrons as compared with their energy before emission, means connected with both detecting means for receiving said signals therefrom and producing a signal proportioned to both of them, means for comparing said proportioned signal with a predetermined standard signal, and means responsive to a difference between said proportioned signal and said standard signal for producing a signal for actuating said moisture content modifying means in correspondence to said difference.

(References on following page)

References Cited by the Examiner

UNITED STATES PATENTS

| | | | |
|---|---|---|---|
| 1,413,934 | 4/1922 | Ramsey et al. | 241—33 X |
| 2,750,144 | 6/1956 | Beckwith. | |
| 2,931,718 | 4/1960 | Greaves | 75—5 |
| 2,971,896 | 2/1961 | Curl | 241—33 X |
| 3,011,726 | 12/1961 | Herz | 241—33 X |
| 3,027,099 | 3/1962 | Ludwig | 241—33 |
| 3,148,971 | 9/1964 | MacDonald et al. | 75—3 X |

FOREIGN PATENTS

| | | |
|---|---|---|
| 667,001 | 7/1963 | Canada. |
| 711,334 | 6/1954 | Great Britain. |

ROBERT C. RIORDON, *Primary Examiner.*

WILLIAM W. DYER, Jr., J. SPENCER OVERHOLSER,
*Examiners.*

D. L. MAXSON, H. F. PEPPER, *Assistant Examiners.*